June 9, 1964

W. F. KRAMER 3,136,968

ELECTRICAL PRESSURE TRANSDUCER

Filed April 12, 1963

INVENTOR
WILLIAM F. KRAMER
BY
Robertson and Smythe
ATTORNEYS

June 9, 1964  W. F. KRAMER  3,136,968
ELECTRICAL PRESSURE TRANSDUCER
Filed April 12, 1963  2 Sheets-Sheet 2
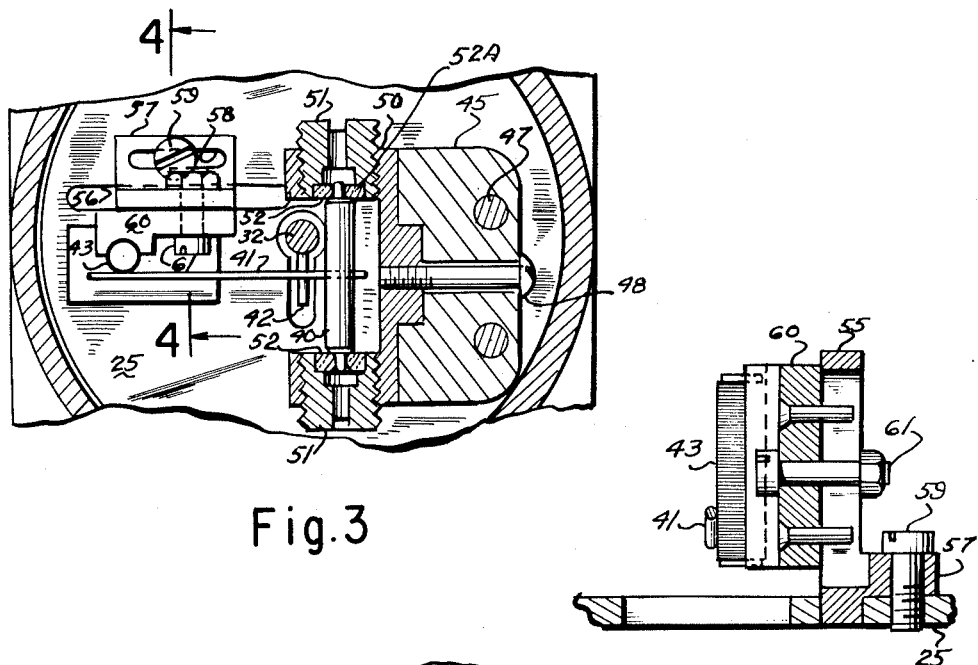
Fig. 3
Fig. 4
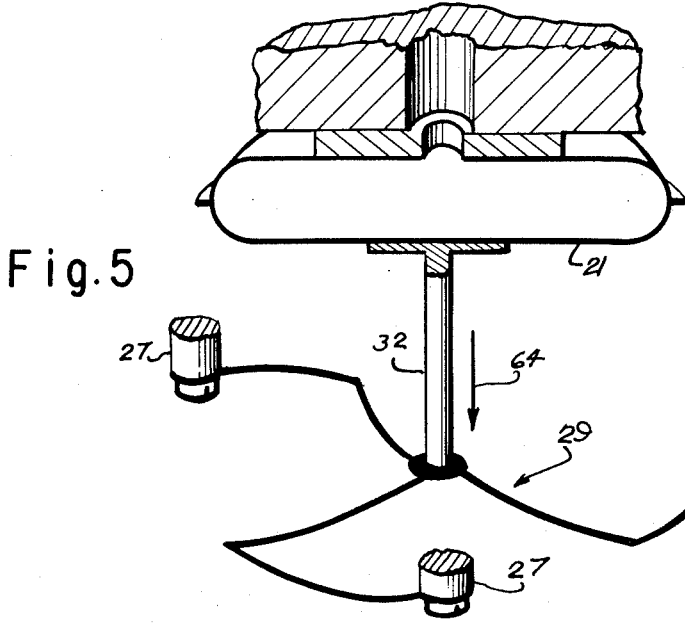
Fig. 5
INVENTOR
WILLIAM F. KRAMER
BY
Robertson & Smythe
ATTORNEYS United States Patent Office 3,136,968
Patented June 9, 1964

3,136,968
ELECTRICAL PRESSURE TRANSDUCER
William F. Kramer, Commack, N.Y., assignor to Ametek,
Inc., New York, N.Y., a corporation of Delaware
Filed Apr. 12, 1963, Ser. No. 272,787
2 Claims. (Cl. 338—41)

The present invention relates to transducers, and particularly to a new and improved pressure transducer having improved stability of operation.

Pressure transducers of the type employing linearly movable, pressure-sensitive means are often required to convert the linear movement thereof into rotary movement for the purpose of amplifying, through linkage, minute pressure variations in the medium to be measured.

In such transducers, problems arise in maintaining the movement of the linearly movable, pressure-sensitive means within sufficiently accurate limits.

The principal object of the present invention is to provide a pressure transducer having linearly movable means of improved accuracy.

Another object of the invention is to provide such a transducer in which improved lateral stability is attained for a bellows-operated, linearly movable element.

Still another object of the invention is to provide such a transducer in which the lateral stability is imparted to the linearly movable means remote from the latter's connection to bellows means.

In one aspect of the invention, a pressure transducer may comprise a base having a connection that may be attached to a source of pressure desired to be measured, the connection communicating with the interior of a pressure-responsive element such as a capsule-type element, a bellows, or their equivalent.

In another aspect of the invention, a linearly movable member such as a rod may be fixed to, and extend from, the bellows along its axis of movement. The rod may include a pin that cooperates with an arcuately movable arm near the center of the arc so as to impart to the free end of the arm a magnified motion of the linear motion incident to bellows operation. The free end of the arcuately movable arm may include a brush for cooperating with a resistor that may be included within an electrical circuit. Thus, the pressure variations within the bellows are converted to electrical resistance variations.

In still another aspect of the invention, lateral stability may be provided for the linearly movable rod that is connected to the bellows. This lateral stability may be provided at a point along the linearly movable rod remote from its attachment to the bellows. Thus, a supporting plate for various components of the instrument may include three equally spaced standards parallel to the linearly movable rod and extending to an elevation substantially the same as the end of said rod remote from the point of its connection to the bellows.

In another aspect of the invention, a resilient spider element having legs that extend radially and circumferentially is attached to the top of the three standards, and its center portion may be apertured to receive the free end of the linearly movable rod. The construction is such that the center portion of the spider moves with the linearly movable rod while imparting to it great lateral stability.

The above as well as other objects, advantages and features of the present invention will become apparent from the following description and drawings, such being merely exemplary.

In the drawings:

FIG. 3 is a sectional view taken substantially along line 3—3 of FIG. 2;

Figure 1:
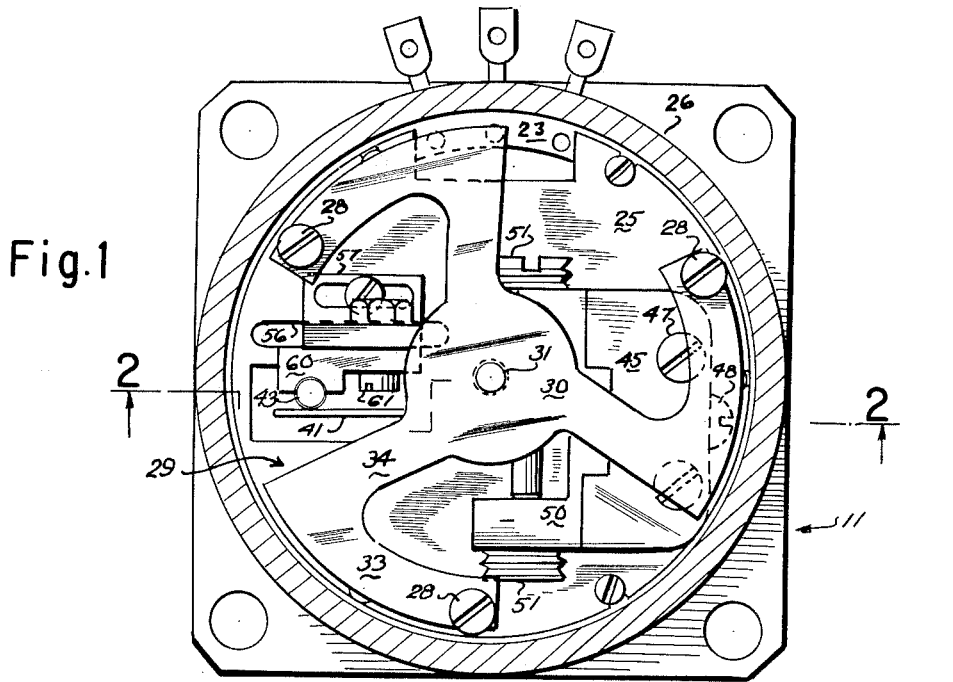
FIG. 1 is a plan sectional view through an instrument embodying the principles of the invention, taken along line 1—1 of FIG. 2 and looking in the direction of the arrows.
Figure 2:
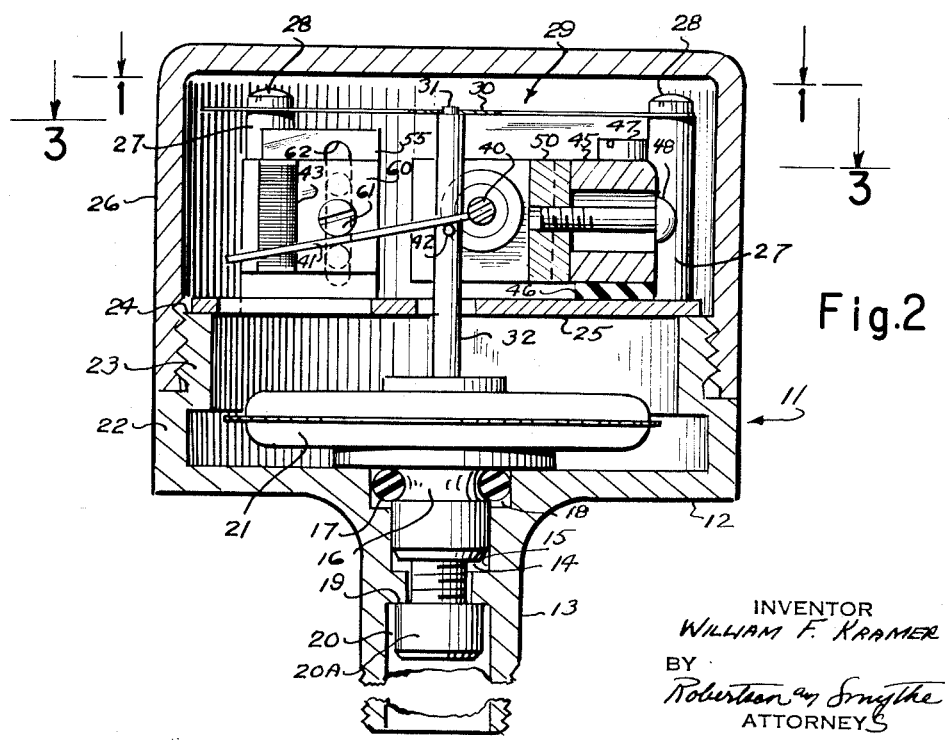
FIG. 2 is a transverse sectional view taken substantially along line 2—2 of FIG. 1.

FIG. 4 is a transverse sectional view taken substantially along line 4—4 of FIG. 3; and FIG. 5 is a diagrammatic view showing the lateral stabilizing unit or member of FIGS. 1 and 2, and the support means therefor, rotated 180° from the position shown in FIG. 2.

In FIGS. 1 and 2, the instrument shown generally at 11 is a pressure-responsive transducer wherein a pressure being measured controls a resistor 43. The resistor may, for example, regulate the current through an electrical circuit. The base portion 12 of the instrument 11 has a central hub portion 13 which may be connected by any suitable means to the pressure desired to be measured. An internally threaded tubular stem 14 is preferably positioned in a central opening 15 of the hub 13. The tubular stem has a reduced portion 16 adapted to receive an O-ring 17 which cooperates with a recess or seat 18 for sealing purposes. The interior of the hub 13 is provided with a ledge 19 by which screw 20 can be tightened into stem 14 for holding the parts in assembled relation. The screw 20 has a through bore 20A for communication between the interior of the hub 13 and the fluid therein and the interior of a bellows 21. Bellows 21 is rigidly attached to stem portion 14. Side wall 22 of the base portion is provided with an inwardly directed cylindrical offset portion 23. The cylindrical offset portion 23 terminates in an annular surface 24 which is adapted to receive a top deck or mounting plate 25 that serves to support other operative parts of the instrument. The outer periphery of offset portion 23 is threaded to receive the internal threads of a cover or cap member 26.

The top deck or plate 25 is preferably provided with three equally spaced post members 27. Each post 27 is located adjacent the periphery of the top deck 25 and each post 27 has an internally threaded upper portion to receive a clamping screw 28. Screws 28 secure a spider-like stabilizing member 29 at a predetermined distance above the annular surface 24. Spider 29 has a central portion 30 provided with an aperture 30A adapted to receive a reduced end portion 31 of an elongated rod 32, the opposite end of which is connected to one side of bellows 21. The rod 32 is of a predetermined length relative to the vertical distances of posts 27 and the vertical dimensions of elements 22, 23 and 25 so that when the bellows is collapsed (FIG. 2), reduced end 31 of the rod 32 will be positioned within the central aperture 30A of the spider. As seen in FIG. 1, spider 29 is provided with three identical outwardly extending portions which are circumferentially spaced equally from each other. Each of the outwardly extending portions includes a circumferential segment 33 having suitable apertured means for connection with one of the posts 27. Circumferential segments 33 are connected to the central portion 30 of the spider 29 by radial arms 34 (FIG. 1).

A horizontal shaft 40 is positioned at right angles to rod 32 and it is normally biased in a counterclockwise direction by a spring (not shown). A contact member 41 is mounted on shaft 40 and is disposed in the path of a pin 42 carried by rod 32. To the left of rod 32 (FIG. 2) is mounted a resistance unit 43. Angular movements of member 41 in response to linear movements of the pin 42 will move it to various points of contact along resistance 43 to reflect the pressure being measured.

The means for supporting the brush includes an insulated block 45 mounted upon top deck or plate 25, there being an electrical insulating member 46 secured therebetween by means of screws 47. The body of a screw 48 extends through a passage or slot 49 in block 45 and is attached to a substantially U-shaped support means 50. Support means 50 has threaded openings in its side walls to receive journal means for shaft 40, the journal means including a pair of longitudinally adjustable, threaded bushings 51 suitably recessed for bearings 52. Bearings 52 are apertured at 52A for receiving reduced end portions of shaft 40.

The support for resistance 43 may include an element 55 (FIG. 4), the base portion of which is positioned in a slot 56 in the top deck or plate 25. The element 55 has a lateral extension 57 bored at 58 to receive a retaining screw 59. Carrying block 60 is adjustably mounted upon the element 55 by means of bolt 61 extending through an elongated slot 62 in the element 55.

FIG. 5 shows the substantially rigid support posts 27 that support the spider 29, which latter provides with posts 27 a considerable lateral support for the central portion of spider 29, tending to confine movements of rod 32 due to deflections of bellows 21 to a direction as shown by the arrow 64.

Although the various features of the new and improved pressure transducer have been shown and described in detail to fully disclose one embodiment of the invention, it will be evident that changes may be made in such details and certain features may be used without others without departing from the principles of the invention.

What is claimed is:

1. In a pressure transducer, a support; expansible diaphragm means mounted on said support and adapted to be connected to a pressure fluid source; a rod having a first end attached to said diaphragm means, said rod being caused to move linearly when the pressure of said fluid fluctuates; electrical resistance means mounted on said support; a pivoted arm mounted on said support and having a brush at its free end for moving in contact over said resistance means; means connected to the central portion of said rod for converting the linear movement of said rod to arcuate movement of said brush; a plurality of parallel standards mounted on said support and arranged parallel to said rod and terminating at an elevation substantially equal to that of the second end of said rod; and arm means extending radially from the terminals of said standards and connected to said second end of said rod for imparting lateral stability to said rod without inhibiting its linear movement.

2. In a pressure transducer, a support; expansible diaphragm means mounted on said support and adapted to be connected to a pressure fluid source; a rod having a first end attached to said diaphragm means, said rod being caused to move linearly when the pressure of said fluid fluctuates; electrical resistance means; a pivot for said arm, said pivot being mounted on said support; a pivoted arm mounted on said support near the central portion of said rod, said arm having a brush at its free end for moving in contact over said resistance means; a pin connected to said rod near the central portion of said rod for swinging said arm about said pivot for converting the linear movement of said rod to arcuate movement of said brush; a plurality of parallel standards mounted on said support and arranged parallel to said rod and terminating at an elevation substantially equal to that of the second end of said rod; and arm means having radial and circumferential portions connected to the terminals of said standards and supporting a central portion having aperture means for receiving the second end of said rod.

References Cited in the file of this patent
UNITED STATES PATENTS
2,857,495    Bourns et al. _____ Oct. 21, 1958